US010423960B2

(12) United States Patent
Amancherla (10) Patent No.: US 10,423,960 B2
(45) Date of Patent: *Sep. 24, 2019

(54) HACKER-RESISTANT BALANCE MONITORING

(71) Applicant: Quisk, Inc., Sunnyvale, CA (US)

(72) Inventor: Praveen Amancherla, Cupertino, CA (US)

(73) Assignee: Quisk, Inc., Sunnyvale, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 14/538,188

(22) Filed: Nov. 11, 2014

(65) Prior Publication Data

US 2015/0120539 A1 Apr. 30, 2015

Related U.S. Application Data

(63) Continuation of application No. 14/066,674, filed on Oct. 29, 2013, now Pat. No. 8,886,570.

(51) Int. Cl.
*G06Q 20/40* (2012.01)
*G06Q 20/36* (2012.01)

(52) U.S. Cl.
CPC ......... *G06Q 20/4016* (2013.01); *G06Q 20/36* (2013.01); *G06Q 20/3676* (2013.01); *G06Q 20/40* (2013.01)

(58) Field of Classification Search
USPC ............................ 705/64–67; 235/379–382.5
See application file for complete search history.

(56) References Cited

U.S. PATENT DOCUMENTS

| 1,331,018 | A | * | 2/1920 | Luthy | H01M 2/18 |
| | | | | | 429/143 |
| 4,114,027 | A | * | 9/1978 | Slater | G06Q 20/1085 |
| | | | | | 340/5.41 |
| 4,994,964 | A | * | 2/1991 | Wolfberg | G06Q 40/02 |
| | | | | | 705/30 |
| 5,117,356 | A | * | 5/1992 | Marks | G06Q 40/12 |
| | | | | | 705/30 |

(Continued)

FOREIGN PATENT DOCUMENTS

| JP | 2011525262 | 9/2011 |
| KR | 20110122032 A | 11/2011 |

(Continued)

OTHER PUBLICATIONS

L. Jean Camp, (An Atomicity-Generating Protocol for Anonymous Currencies) (Year: 2011).*

(Continued)

*Primary Examiner* — Mamon Obeid
(74) *Attorney, Agent, or Firm* — MLO, a professional corp.

(57) ABSTRACT

Methods of and systems for securely monitoring a balance of a payment account include storing, in a first database, ledger data and storing, in a second database, wallet data. Wallet data includes a wallet balance value for the payment account. When a transaction is initiated using the payment account, an access operation is performed on the wallet table. Illicit or improper modifications can be detected by deriving a ledger comparison value from the ledger data and comparing the derived ledger comparison value to a wallet comparison value from the wallet data.

20 Claims, 6 Drawing Sheets

(56) References Cited

U.S. PATENT DOCUMENTS

| | | | |
|---|---|---|---|
| 5,428,684 A * | 6/1995 | Akiyama | G06Q 20/02 235/380 |
| 5,630,073 A * | 5/1997 | Nolan | G06Q 20/042 705/45 |
| 5,644,118 A * | 7/1997 | Hayashida | 235/379 |
| 5,644,727 A * | 7/1997 | Atkins | G06Q 20/102 705/40 |
| 5,740,427 A * | 4/1998 | Stoller | |
| 5,796,831 A * | 8/1998 | Paradinas | G06Q 20/105 235/379 |
| 5,805,798 A * | 9/1998 | Kearns et al. | 714/48 |
| 5,825,882 A * | 10/1998 | Kowalski | G06F 12/1408 713/172 |
| 5,862,224 A * | 1/1999 | Gilbert | G06Q 20/341 380/28 |
| 5,884,289 A | 3/1999 | Anderson et al. | |
| 5,914,471 A * | 6/1999 | Van De Pavert | 235/380 |
| 5,926,816 A * | 7/1999 | Bauer et al. | |
| 5,936,219 A * | 8/1999 | Yoshida | G06Q 20/04 235/379 |
| 5,982,890 A * | 11/1999 | Akatsu | G06F 21/645 380/2 |
| 5,987,438 A * | 11/1999 | Nakano | G06K 7/0013 235/375 |
| 5,991,747 A * | 11/1999 | Tomoyuki et al. | 705/41 |
| 6,038,552 A * | 3/2000 | Fleischl et al. | 705/44 |
| 6,129,272 A * | 10/2000 | Yoshida | G06Q 20/04 235/379 |
| 6,138,907 A * | 10/2000 | Mori et al. | 235/379 |
| 6,205,434 B1 * | 3/2001 | Ryan et al. | 705/36 R |
| 6,257,487 B1 * | 7/2001 | Hayashida | 235/379 |
| 6,374,264 B1 * | 4/2002 | Bohannon et al. | |
| 6,434,238 B1 * | 8/2002 | Chaum | G06Q 20/341 380/30 |
| 6,609,113 B1 | 8/2003 | O'Leary et al. | |
| 6,609,655 B1 * | 8/2003 | Harrell | 235/380 |
| 6,629,081 B1 | 9/2003 | Cornelius et al. | |
| 6,718,314 B2 * | 4/2004 | Chaum | G06Q 20/341 705/64 |
| 6,842,743 B2 * | 1/2005 | Yu | G06Q 20/04 382/100 |
| 6,941,285 B2 * | 9/2005 | Sarcanin | G06Q 20/02 235/379 |
| 7,095,853 B2 * | 8/2006 | Morishita | G06F 12/1408 380/201 |
| 7,142,651 B2 | 11/2006 | Ronen et al. | |
| 7,177,830 B2 | 2/2007 | Shields et al. | |
| 7,204,412 B2 * | 4/2007 | Foss, Jr. | G06F 21/31 235/379 |
| 7,314,168 B1 * | 1/2008 | Gorres et al. | 235/380 |
| 7,346,578 B1 * | 3/2008 | Ishida | G06Q 20/10 235/379 |
| 7,360,091 B2 * | 4/2008 | Aikawa | G06Q 20/06 705/13 |
| 7,380,710 B2 * | 6/2008 | Brown | G06Q 20/105 235/380 |
| 7,403,917 B1 | 7/2008 | Larsen | |
| 7,480,631 B1 * | 1/2009 | Merced | G06Q 20/3674 235/380 |
| 7,520,421 B2 | 4/2009 | Salafia et al. | |
| 7,552,094 B2 * | 6/2009 | Park | G06Q 20/10 705/65 |
| 7,693,787 B2 | 4/2010 | Provinse | |
| 7,716,135 B2 * | 5/2010 | Angell | G06Q 20/10 705/44 |
| 7,756,763 B1 * | 7/2010 | Owens et al. | 705/34 |
| 7,778,832 B2 * | 8/2010 | Broman | G06Q 20/341 704/246 |
| 7,778,840 B2 * | 8/2010 | Krause | G06Q 10/10 705/1.1 |
| 7,798,394 B2 * | 9/2010 | Hill | G06K 7/0008 235/375 |
| 7,873,573 B2 * | 1/2011 | Realini | G06Q 20/04 235/379 |
| 7,877,299 B2 * | 1/2011 | Bui | G06Q 20/02 705/26.41 |
| 8,001,042 B1 * | 8/2011 | Brunzell | G06Q 40/02 705/38 |
| 8,151,335 B2 * | 4/2012 | Wankmueller | G06Q 20/04 370/254 |
| 8,160,965 B2 * | 4/2012 | Mishura | G06F 21/10 705/59 |
| 8,190,520 B1 | 5/2012 | Hyland | |
| 8,271,396 B2 * | 9/2012 | Ronning | G06Q 20/10 705/26.8 |
| 8,281,373 B2 * | 10/2012 | Fujii | G07C 9/00158 713/168 |
| 8,527,406 B2 | 9/2013 | Cohen | |
| 8,566,949 B2 * | 10/2013 | Ikeda | G06F 21/10 713/193 |
| 8,650,214 B1 * | 2/2014 | Wilhelm | H04L 63/1483 707/782 |
| 8,650,241 B2 | 2/2014 | William et al. | |
| 8,745,752 B2 * | 6/2014 | Baba | G06Q 20/3552 713/194 |
| 8,886,570 B1 * | 11/2014 | Amancherla | G06Q 20/3676 235/379 |
| 8,959,032 B2 * | 2/2015 | Fernandes | G06Q 20/02 705/44 |
| 9,519,902 B2 * | 12/2016 | Amancherla | G06Q 20/4016 |
| 2001/0029174 A1 * | 10/2001 | Herajarvi et al. | 455/406 |
| 2002/0013767 A1 | 1/2002 | Katz | |
| 2002/0060242 A1 * | 5/2002 | Hayashida | G06Q 20/04 235/379 |
| 2002/0095388 A1 * | 7/2002 | Yu | G06Q 20/04 705/67 |
| 2002/0153415 A1 * | 10/2002 | Minami et al. | 235/380 |
| 2002/0161678 A1 * | 10/2002 | Jaffe | 705/35 |
| 2002/0193093 A1 * | 12/2002 | Henrikson et al. | 455/407 |
| 2002/0194137 A1 * | 12/2002 | Park | G06Q 20/10 705/64 |
| 2003/0028529 A1 * | 2/2003 | Cheung et al. | 707/3 |
| 2003/0046230 A1 * | 3/2003 | Jacobs | G06Q 20/04 705/42 |
| 2003/0046286 A1 * | 3/2003 | Jacobs et al. | 707/8 |
| 2003/0050899 A1 * | 3/2003 | Tushie | G06Q 20/367 705/65 |
| 2004/0025021 A1 * | 2/2004 | Aikawa | G06Q 20/06 713/172 |
| 2004/0128240 A1 | 7/2004 | Yusin | |
| 2004/0158549 A1 * | 8/2004 | Matena et al. | 707/1 |
| 2004/0162772 A1 * | 8/2004 | Lewis | 705/34 |
| 2004/0208164 A1 * | 10/2004 | Keenan et al. | 370/352 |
| 2005/0092828 A1 * | 5/2005 | Phillips et al. | 235/380 |
| 2005/0216497 A1 * | 9/2005 | Kruse et al. | 707/101 |
| 2006/0206355 A1 * | 9/2006 | Cheung et al. | 705/1 |
| 2006/0213980 A1 * | 9/2006 | Geller et al. | 235/380 |
| 2007/0016535 A1 * | 1/2007 | Tedesco | G06Q 20/04 705/67 |
| 2007/0118383 A1 | 5/2007 | Fukada et al. | |
| 2007/0118483 A1 * | 5/2007 | Hill | G06K 7/0008 705/64 |
| 2007/0125840 A1 * | 6/2007 | Law et al. | 235/379 |
| 2007/0156546 A1 | 7/2007 | Oppert et al. | |
| 2007/0168265 A1 * | 7/2007 | Rosenberger | 705/30 |
| 2007/0220007 A1 * | 9/2007 | Narita | G06F 21/31 |
| 2007/0265973 A1 * | 11/2007 | Kahn | G06F 21/10 705/57 |
| 2008/0008452 A1 | 1/2008 | Nagaoka et al. | |
| 2008/0019214 A1 | 1/2008 | Pramik | |
| 2008/0040284 A1 * | 2/2008 | Hazel | G06F 21/72 705/64 |
| 2008/0082452 A1 * | 4/2008 | Wankmueller | G06Q 20/04 705/67 |
| 2008/0103981 A1 * | 5/2008 | Park | G06Q 20/10 705/64 |
| 2008/0162373 A1 * | 7/2008 | Adler et al. | 705/36 R |
| 2008/0189214 A1 * | 8/2008 | Mueller | G06Q 20/20 705/65 |

(56) References Cited

U.S. PATENT DOCUMENTS

| | | |
|---|---|---|
| 2009/0012889 A1* | 1/2009 | Finch .............................. 705/35 |
| 2009/0063354 A1 | 3/2009 | Sheets et al. |
| 2009/0216666 A1* | 8/2009 | Antao .................... G06Q 10/10 |
| | | 705/30 |
| 2009/0265260 A1 | 10/2009 | Aabye et al. |
| 2009/0265271 A1* | 10/2009 | Aabye et al. ................... 705/41 |
| 2009/0313108 A1* | 12/2009 | Cooper ...................... 705/14.27 |
| 2010/0057622 A1* | 3/2010 | Faith ...................... G06Q 20/04 |
| | | 705/71 |
| 2010/0088227 A1* | 4/2010 | Belamant ............... G06Q 20/04 |
| | | 705/41 |
| 2010/0211507 A1 | 8/2010 | Aabye et al. |
| 2011/0029396 A1* | 2/2011 | Sobek .............................. 705/17 |
| 2011/0226852 A1* | 9/2011 | Brennan ....................... 235/379 |
| 2011/0252310 A1* | 10/2011 | Rahaman ............ G06F 17/2211 |
| | | 715/255 |
| 2012/0028714 A1* | 2/2012 | Gagner et al. .................. 463/42 |
| 2012/0041871 A1* | 2/2012 | Sell et al. ........................ 705/39 |
| 2012/0078785 A1* | 3/2012 | Anthony et al. ................ 705/42 |
| 2012/0095885 A1* | 4/2012 | Seay et al. ...................... 705/30 |
| 2012/0310778 A1 | 12/2012 | Paulsen et al. |
| 2013/0041776 A1 | 2/2013 | Schunemann |
| 2013/0054429 A1* | 2/2013 | Minor et al. .................... 705/30 |
| 2013/0117183 A1 | 5/2013 | Bozeman |
| 2015/0120539 A1* | 4/2015 | Amancherla ...... G06Q 20/3676 |
| | | 705/41 |
| 2017/0011366 A1* | 1/2017 | Pyo ........................ G06Q 20/10 |
| 2017/0091773 A1* | 3/2017 | Amancherla ......... G06F 21/552 |
| 2018/0337769 A1* | 11/2018 | Gleichauf ............. H04L 9/3239 |

FOREIGN PATENT DOCUMENTS

| | | |
|---|---|---|
| WO | 03012716 A1 | 2/2003 |
| WO | 2005043428 A1 | 5/2005 |
| WO | 2007011695 A2 | 1/2007 |

OTHER PUBLICATIONS

Nonfinal Office Action dated Mar. 6, 2014 for U.S. Appl. No. 14/066,674.
Final Office Action dated Jun. 6, 2014 for U.S. Appl. No. 14/066,674.
Notice of Allowance dated Oct. 7, 2014 for U.S. Appl. No. 14/066,674.
International Search Report and Written Opinion dated Jan. 26, 2015 for PCT Patent Application No. PCT/US2014/060351.

* cited by examiner

FIG. 6

HACKER-RESISTANT BALANCE MONITORING

CROSS-REFERENCE TO RELATED APPLICATIONS

This application is a continuation of U.S. patent application Ser. No. 14/066,674, filed Oct. 29, 2013 and issued as U.S. Pat. No. 8,886,570 on Nov. 11, 2014, which is hereby incorporated by reference in its entirety for all purposes.

BACKGROUND OF THE INVENTION

Electronic payments in the form of credit card transactions and other alternatives payment methods are ubiquitous in the modern economy and are rapidly expanding into the furthest recesses of the developing world. Electronic payments provide numerous benefits in the form of added convenience and security. Unlike cash, means for conducting electronic payments are generally tied to a person's identity, which therefore adds an additional layer of security. However, electronic payments systems are exposed to their own forms of risk. A particularly virulent strain of these particular risks lies in the recent increase in the sophistication and prevalence of hacker attacks on secure systems.

Payment processors are a particularly appealing target for hackers because of the potential for monetary gains that may be obtained from spoofing the system into improperly transferring money out of the system. Sophisticated hackers have shown themselves able to modify the properties of a payment system to artificially increase the balance of an account and withdraw funds from the account before the administrators of the system are able to detect that the account has been compromised. Likewise, hackers have shown themselves able to remove funds from an account and then readjust the balance of the account to digitally cover their tracks.

While security is of paramount importance for electronic payment systems, security cannot be enforced at the expense of convenience. Indeed, there are heavy costs associated with enforcing security measures too strictly in that occasional false positive fraud detection events will deny, and inconvenience, a customer in a product space where consumer demand is almost entirely based on convenience. Methods and systems for limiting the cost of fraud in payment systems while maintaining convenience for users of a payment system are therefore of the utmost importance.

SUMMARY

The present invention relates to balance monitoring systems, and in particular, to balance monitoring systems that are resistant to security attacks. Balance monitoring can be directed to the detection of any kind of improper balance modification including through security attacks and human or machine error. Embodiments are better understood upon consideration of the detailed description below in conjunction with the accompanying drawings and claims.

In one embodiment, a computer-implemented method of securely monitoring a balance of a payment account is provided. The method includes encrypting ledger data to produce encrypted ledger data. The ledger data includes ledger transaction information for the payment account. The method also includes storing a ledger table with the encrypted ledger in a first database data. The method also includes storing a wallet table with non-encrypted wallet data that includes a wallet balance value for the payment account in a second database. The method also includes performing an access operation on the wallet table when a transaction is initiated using the payment account. The method also includes detecting whether at least one of the ledger table and the wallet table has been improperly modified. The detecting includes decrypting the ledger data, deriving a ledger comparison value from the decrypted ledger data, and comparing the ledger comparison value to a wallet comparison value from the wallet data.

In another embodiment, a computer-implemented method of securely monitoring a balance of a payment account is provided. The method includes storing a ledger table with ledger data in a first database. The first database is stored on a non-transitory computer-readable storage medium. The method also includes storing a wallet table with wallet data that includes a wallet balance value for the payment account in a second database. The second database is stored in a cache with a cache data rate that is higher than a storage media data rate of the storage medium. The method also includes performing an access operation on the wallet table when a transaction is initiated using the payment account. The method also includes detecting whether at least one of the ledger table and the wallet table has been improperly modified. The detecting includes deriving a ledger comparison value from the ledger data and comparing the derived ledger comparison value to a wallet comparison value from the wallet data.

In another embodiments, a computer-based system for securely monitoring a balance of a payment account is provided. The system includes an encryption module configured to encrypt ledger data, that includes ledger transaction information for the payment account, to produce encrypted ledger data. The system also includes a data access module configured to (i) store, in a first database, a ledger table with the encrypted ledger data, (ii) store, in a second database, a wallet table with non-encrypted wallet data that includes a wallet balance value for the payment account, and (iii) when a transaction is initiated using the payment account, perform an access operation on the wallet table. The system also includes a detection module configured to detect whether at least one of the ledger table and the wallet table has been improperly modified, by: decrypting the ledger data; deriving a ledger comparison value from the decrypted ledger data, and comparing the ledger comparison value to a wallet comparison value from the wallet data.

DETAILED DESCRIPTION

A detailed description of one or more embodiments of the invention is provided below along with figures that illustrate various aspects of the invention.

In electronic payment systems, many transactions require the use of only a few access operations. For example, purchase transactions require the simple access operation of a balance check to verify that the purchaser's account has sufficient funds to effectuate the transactions. As a result, only the few access operations become the most frequently used. Other types of transactions—for example, any transaction that debits the account—also heavily use the balance check access operation. Debiting an account and crediting an account are examples of other access operations that may also be frequently used.

Similarly, the more frequently accessed data may also have lower security requirements. For example, checking an account balance only requires a read operation, in contrast with the potentially more security-sensitive write operation associated with updating the account balance. Further, the balance itself may not necessarily be as sensitive as other information, such as a transaction history associated with an account.

Thus, a traditional method of storing all transactional data in a single physical or logical location at a single security level and having all access operations available to all authenticated requesters unnecessarily exposes additional data to security risks when only lower security data is accessed. Furthermore, the transactional data may be subject to numerous implemented security measures (such as encryption, intrusion detection, firewalls, authentication, authorization, anti-malware, backups and mirroring, and more) all of which become computationally expensive to handle when processing high transaction volumes. The one or more embodiments disclosed herein improve the security and the efficiency of a payment system in accordance with these foregoing principles.

Figure 1:
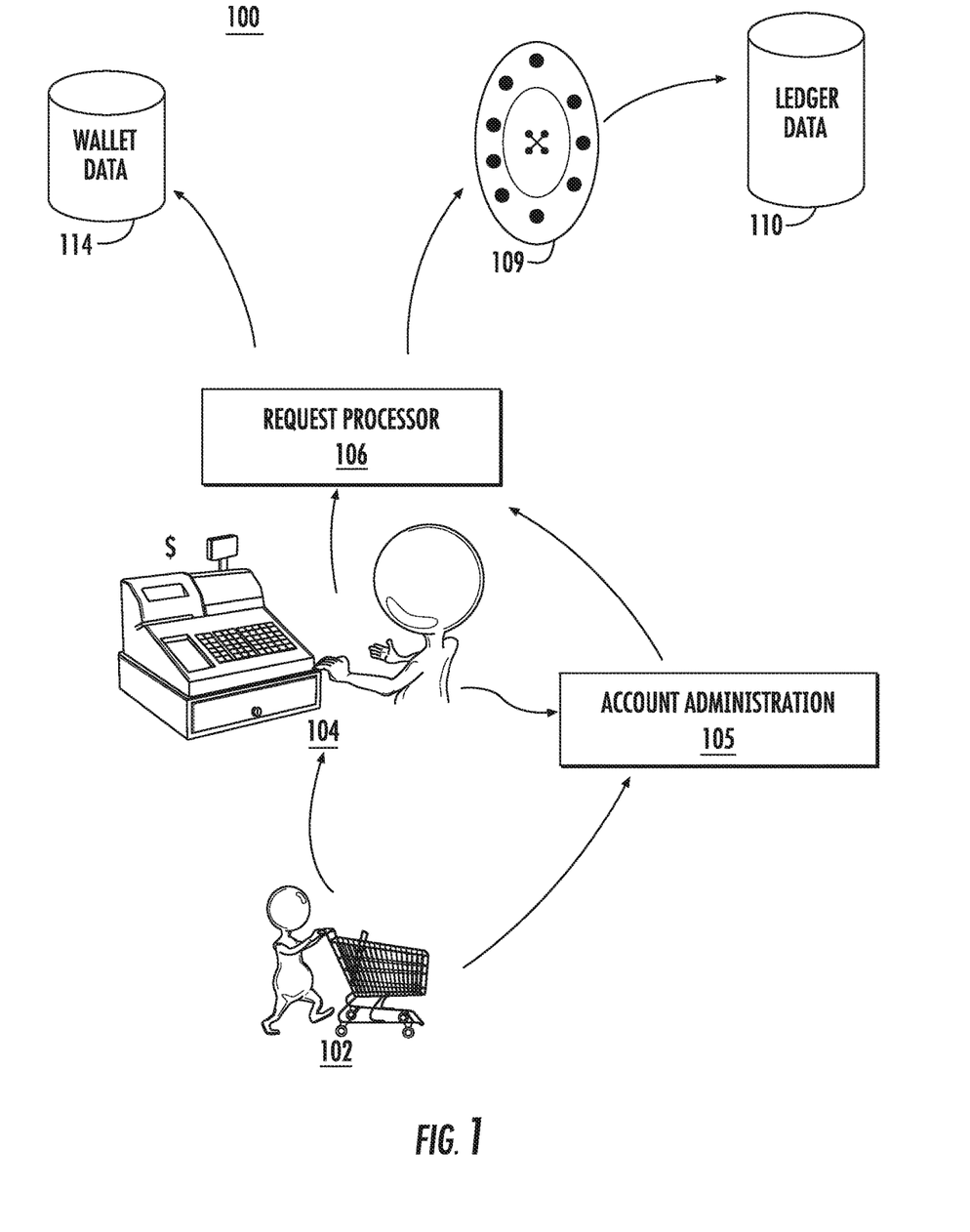
FIG. 1 is a network diagram of an exemplary transaction processing system.

FIG. 1 is a network diagram of an exemplary transaction processing system 100. The diagram shows the transaction processing system 100 processing two broad classes of transactions including purchase/sale transactions and administrative transactions. However, the transaction processing system 100 can process other transactions, for example, loans, mortgages, rental payments, interest payments, dividend payments, grants, gifts, and even non-financial transactions.

A purchase/sale transaction can be initiated by system users such as a consumer 102 and a merchant 104. For example, the consumer 102 can request a purchase of goods and services from the merchant 104, or the merchant 104 may directly initiate a sale of goods and services from the consumer 102. The consumer 102 and merchant 104 decide on various parameters, called transaction information, which can be included in a transaction request. The transaction request can include authentication information, a timestamp, merchant information, consumer information, goods and services information, or any other information related to the initiated transaction. The transaction request can be created by the merchant 104, or more specifically, by an electronic device used by the merchant 104 such as an electronic kiosk, credit card machine, debit card machine, or other electronic POS devices. After creating the transaction request, the merchant 104 sends the request to a request processor 106 through a network (not shown).

The request processor 106 handles the transaction request for efficient and secure downstream processing. The request processor 106 determines whether to access, through a data access module, ledger data 110 stored in a first database or to access, through the data access module, wallet data 114 stored in a second database by parsing and/or filtering the transaction request. The determination can be facilitated by providing to the request processor 106 information as to the types of data in the wallet data and/or the ledger data, the location of the wallet data and/or the ledger data, an expected access time of the wallet data and/or the ledger data, and the security limitations of the transaction, the ledger data, and the wallet data.

The ledger data 110 is preferably configured to include information that is subject to more security restrictions than the wallet data 114. Ledger data 110 can include transaction information of completed transactions. Ledger data 110 can be sent to or accessed by a financial institution. The financial institution can be a bank that offers an account used in combination with the payment system. The account can be restricted to only allow transfers within the payment system, or the account can less tightly bound to the payment service and also be associated with a credit or debit card offered by the financial institution. The financial institution can also be a bank offering an account that is specifically purposed for use with the payment service. Transaction information of completed transactions held in the ledger data 110 can be marked (or unmarked) to indicate that the marked (or unmarked) transaction information has not yet been sent to or accessed by the financial institution for accounting.

The wallet data 114 is preferably configured to include information that is not subject to as rigorous security requirements as the ledger data 110. The wallet data 114 is preferably configured to be stored in a cache that has a lower access time than the ledger data 110. Regardless, the data access algorithm used by the request processor 106 can prioritize accessing the wallet data 114 over the ledger data 110, if the requested data exists in the wallet data 114 and the wallet data 114 supports the requested access operation (e.g., check balance, credit account, debit account, add transaction, etc.). The wallet data 114 (or subsets of the wallet data 114) can also be flagged for protection. For example, flagging the wallet data 114 with HIDDEN puts the wallet data 114 in a hidden mode such that it cannot be read until the flag is removed, flagging the wallet data 114 with READ_ONLY puts the wallet data 114 in a read-only mode such that it cannot be updated but it can be read, and flagging the wallet data 114 with WRITE puts the wallet data 114 in a writable mode such that it can be written. In some situations, the wallet data 114 can be completely sufficient for transaction request processing such that if the request processor 106 accesses the wallet data 114, the request processor 106 does not need to access the ledger data 110 and can be configured to refrain from accessing the ledger data 110 with respect to the transaction.

Balances are one example of data that can be included in the wallet data 114. In this example, pursuant to the request processor 106 receiving the transaction request in connection with the purchase/sale transaction, the request processor 106 can be configured to access the wallet data 114 to determine if a balance in the consumer's account is sufficient to effect the purchase. If the request processor determines that the balance reported by the wallet data 114 is not sufficient to effect the purchase, the request processor 106 can quickly return a response to the requestor (e.g., consumer 102 or merchant 104) without having to access the ledger data 110 behind security mechanism 109. Thus, the security of the ledger data 110 is not compromised and the response can be returned without having to encounter the security mechanism 109 and perform computationally expensive security operations.

The wallet data 114 is not limited to including only balance information. Because the wallet data is stored in a cache with a lower access time and is subject to lower security requirements, the wallet data can include any information that has lower security requirements and preferably is more frequently accessed. Although the security requirements can be dependent on numerous standards and protocols, some examples of wallet data include balance information (with associated account identification and information), transaction information, account locking rules, goods and services information, and merchant information.

The transaction processing system 100 is not limited to processing purchase/sale transactions. As another example of a transaction, an administrative transaction can be initiated by system users such as consumer 102 and merchant 104, who can be accountholders authorized to administer accounts through account administration 105. For example, user 104 can initiate an electronic funds transfer to an external user (not shown) as a gift or grant. A transaction request is constructed by account administration 105, and the constructed transaction request is sent to the request processor 106 through a network. In a similar manner as described above, the request processor 106 handles the transaction request by parsing the request and determining whether to access wallet data 114 and/or ledger data 110 to effectuate the transfer transaction request. If the wallet data 114 is configured to store a balance value for the account requested to be debited according to the transaction request, the request processor 106 accesses the wallet data 114 to determine if the account has sufficient funds to proceed. If the request processor 106 determines that the account has sufficient funds to proceed, the request processor 106 can update information in the wallet data 114 and/or update information in the ledger data 110.

Several update strategies for updating wallet data 114 and/or ledger data 110 can be implemented in the system after the balance is determined to be sufficient for the requested transaction. The particular update strategy chosen can depend on security requirements, expected system performance, which data is stored in the wallet data 114, and which data is stored in the ledger data 110.

As a first update strategy, the request processor 106 can update the wallet data 114 immediately upon processing the transaction request and not update the ledger data 110 immediately. Under this strategy, any updates to the wallet data 114 can be synchronized to the ledger data 110 at a later time, for example, according to a predetermined period. This strategy provides faster real-time (or near real-time) processing of updates and may be preferred when the system is expected to process a high volume of requests with each individual party-pair to a transaction initiating fewer requests, such as consumer-initiated purchase/sale transactions (e.g., retailers).

As a second update strategy, the request processor 106 can update both the wallet data 114 and the ledger data 110 immediately upon processing the transaction request. This strategy better ensures data synchronization and real-time atomicity and may be preferred when the system is expected to process fewer and/or higher criticality requests, such as periodically recurring payments (e.g., mortgages).

As a third update strategy, the request processor 106 can update the ledger data 110 immediately upon processing the transaction request and not update the wallet data 114 immediately. Under this strategy, any updates to the ledger data 110 can be synchronized to the wallet data 114 at a later time, for example, according to a predetermined period. This strategy may be preferred when certain system resources are unavailable, for example, the wallet data 114 is temporarily inaccessible. The request processor 106 may choose and alter update strategies based on a variety of factors, such as transaction type, temporal periods, system performance and/or availability, security requirements, and/or system administrator configuration. Different update strategies can also be applied to different subsets of data within the wallet data 114 and the ledger data 110 as described in more detail below. The update strategies may be chosen and altered adaptively as factors change.

Figure 2:
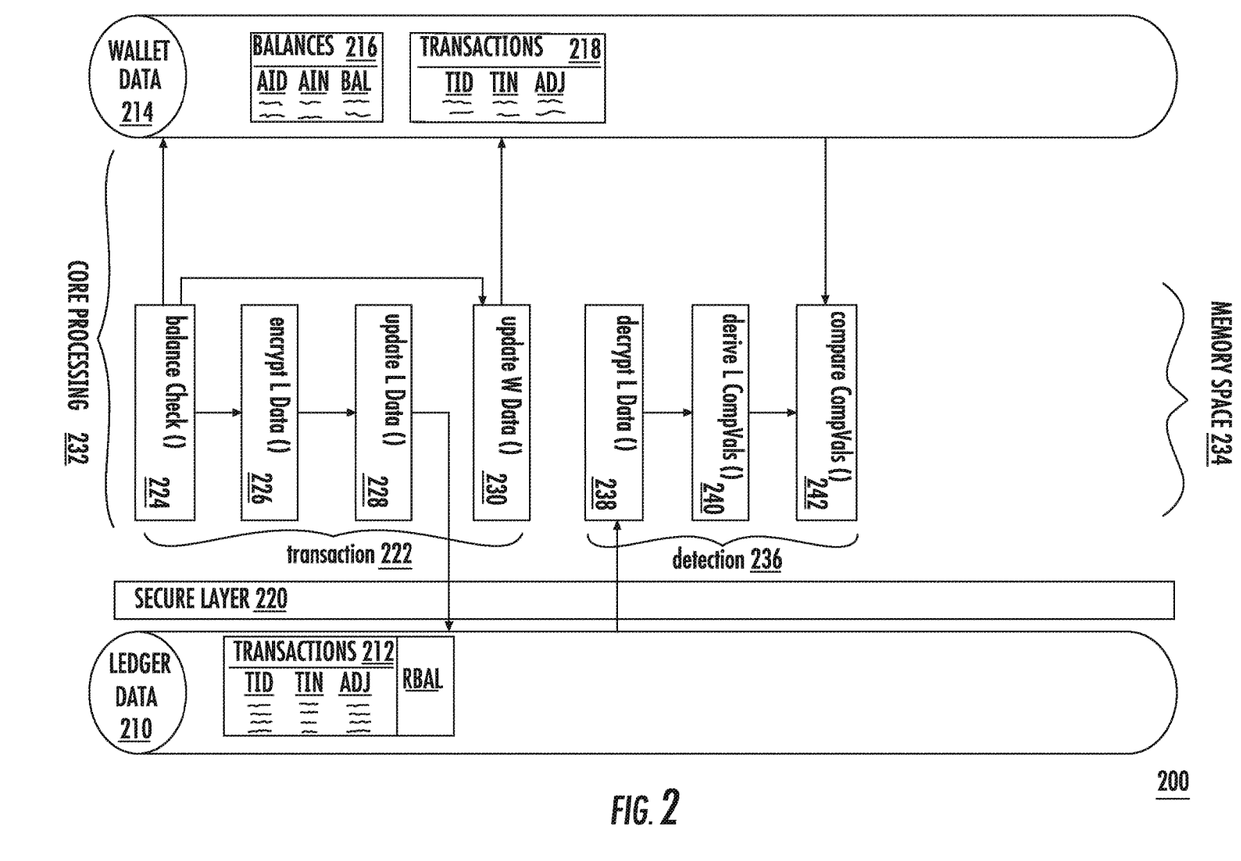
FIG. 2 is ladder diagram of core processing according to an exemplary transaction processing system.

FIG. 2 is ladder diagram of core processing according to an exemplary transaction processing system 200. The system 200 includes ledger data 210, wallet data 214, secure layer 220, core processing 232, and a memory space 234.

The ledger data 210 can be stored in one or more tables in a database. For example, the ledger data 210 can include a transactions table 212 that has a transaction_id column (TID), an adjustment column (ADJ), and one or more transaction_information columns (TIN). The ledger data 210 can also include any other data related to ledger information, such as a running_balance (RBAL) column.

The ledger data 210 can be accessed through the secure layer 220, which secures the ledger data 210 according to security requirements. For example, secure layer 220 can represent an encryption layer such that any subset of data in the ledger data 210 can be encrypted, a firewall, a malware scanner, and/or any other security mechanism. Components shown below the secure layer 220 can be secured while components shown above the secure layer 220 are not necessarily secure (though they can be).

The wallet data 214 can be stored in one or more tables in a database that can be the same as or separate from the database storing the ledger data 210. Preferably, the wallet data 214 is stored physically and logically separate from the ledger data 210 to realize advantages discussed herein. For example, if the wallet data 214 is not encrypted, the system does not need to decrypt the wallet data 214 to read it, thus saving a computationally expensive operation. The wallet data 214 includes, for example, a balances table 216 that has an account_id column (AID), a balance column (BAL), and one or more account_information columns (AIN). The wallet data 214 can also include any other data related to accounts, such as a transactions table 218 with similar data to the transactions table 212 storing ledger data 210.

The core processing 232 can be performed by a central or distributed processing unit, such as the request processor 106. For example, the core processing 232 can perform transaction methods 222 or detection methods 236. These methods are examples of access operations and can be stored on a computer-readable storage medium and will run in the memory space 234, either of which may be singular or distributed. For example, some methods, such as the encryptLData( ) method 226 can be performed on the data access layer (not shown); the data access layer can be considered a part of the request processor 106. Not every method needs to be executed upon each transaction and other methods, subroutines, and/or helper functions may be executed. Further, some of the exemplary methods can execute as subroutines of other methods.

The transaction methods 222 can be executed pursuant to the system 200 receiving a transaction request, e.g., through a request processor. The methods 222 can include a balanceCheck( ) method 224, the encryptLData( ) method 226, an updateLData( ) method 228, and an updateWData( ) method 230. To check the balance of an account used in the initiated transaction according to the transaction request, the core processing 232 can execute a balanceCheck( ) method 224 by querying the wallet data 214 and specifically the balances table 216. For example, the balanceCheck( ) method 224 might execute a SQL query:

SELECT BAL FROM BALANCES WHERE AID=tr_aid;

where tr_aid is a value of the account ID (e.g., a primary key) according to the transaction request. The return value of the query can be used to compare against the requested debit amount of the transaction request to determine if sufficient funds exist in the account. If sufficient funds do not exist, the core processing 232 can generate a message to notify the requestor immediately. If sufficient funds do exist, the core processing 232 can invoke methods to update the wallet data 214 and the ledger data 210 according to the parameters of the transaction request. For example, the updateWData( ) method 230 might update the wallet data 214 by executing a SQL query:

UPDATE BALANCES SET BAL=BAL+adjustment WHERE AID=tr_aid;

where adjustment is a value of the credit or debit according to the transaction request. In addition, depending on the update strategy chosen by the request processor and/or the data that exists in the wallet data 214, the updateWData( ) method 230 might update the transaction table 218 of the wallet data 214 by executing a SQL query:

INSERT INTO TRANSACTIONS (TIN,ADJ) VALUES ({transaction_information}, adjustment);

where {transaction_information} is any subset of transaction information parsed from the transaction request or otherwise determined by the request processor.

After determining that the balance is sufficient to execute the request transaction, the core processing 232 can optionally update the ledger data 210 (depending on the chosen update strategy) by executing, for example, the encryptLData( ) method 226 and the updateLData( ) method 228. The encryptLData( ) method 226 is an example of a method executed in accordance with an authorized data access through secure layer 220, and other methods of authorized data access through secure layer 220 can be used. The encryptLData( ) method 226 prepares data corresponding to the requested transaction for insertion and/or update into the ledger data 210, for example, by encrypting the data for insertion and/or update. Once the data is encrypted, the updateLData( ) method 228 inserts and/or updates the data in the ledger data 210 accordingly.

Figure 4:
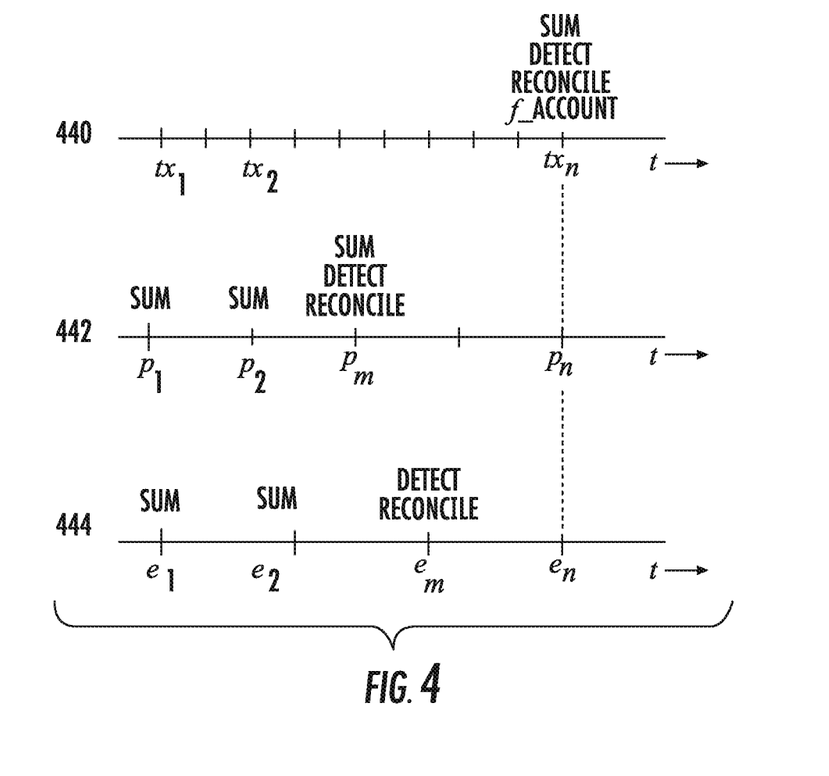
FIG. 4 is a set of timelines according to various detection frequency strategies of an exemplary system.

The detection methods 236 can be executed pursuant to the system 200 receiving (or executing) a detection request, e.g., through an automated, scheduled task that executes periodically or according to another detection frequency strategy as explained herein (see, e.g., FIG. 4). Detection methods can be executed to detect illicit modification of the wallet data 214 and/or the ledger data 210, because the wallet data 214 and ledger data 210 may be stored in physically and/or logically separate databases. The detection methods 236 can detect illicit modification of stored data by comparing wallet data with ledger data. For example, the methods 236 can include a decryptLData( ) method 238, a deriveLCompVal( ) method 240, and a compareComp Vals( ) method 242. To derive a comparison value from the ledger data ("ledger comparison value"), the core processing 232 can execute the decryptLData( ) method 238 and the deriveLCompVal( ) method 240 by querying the transactions table 212 and/or RBAL and decrypting accordingly. Though not shown, the core processing 232 can also execute a deriveWCompVal( ) method (which can run as a subroutine of the compareCompVals( ) method, for example) to derive a comparison value from the wallet data ("wallet comparison value"). When the core processing 232 has derived at least two comparison values (e.g., balances), the compareCompVals( ) method 242 can be executed to compare the values. The determination of whether any data has been illicitly modified can be based on this comparison. For example, if a value of a balance for an account A in the wallet data 214 does not match a value of a balance for the account A in the ledger data 210, then the core processing 232 may take appropriate actions, including, but not limited to, reconciliation and notification.

For enhanced security, the memory space 234 can preferably be protected, for example, from being accessed by unauthorized processes and/or threads, and the decrypted ledger data can be held only in the protected memory space for a duration of the detection method. Preferably, the decrypted ledger data is erased from the protected memory space when the comparing step is complete, such that the decrypted ledger data cannot be retrieved through data forensics.

Figure 3:
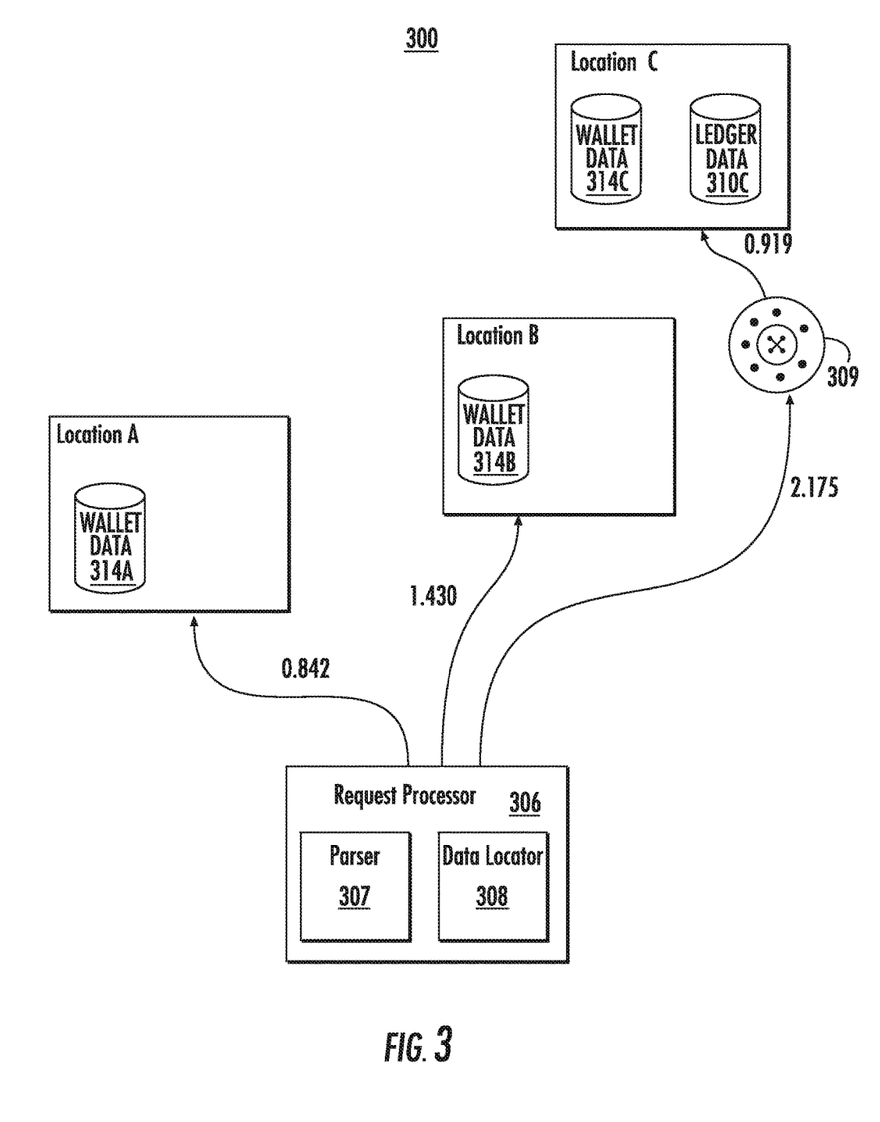
FIG. 3 is a network diagram of an exemplary transaction processing system.

FIG. 3 is a graph-based network diagram of an exemplary transaction processing system 300. Vertices of the graph are various network locations including request processor 306 and locations A-C. Locations A-C can include wallet data 314A-C; locations A-B do not have ledger data, but location C has ledger data 310C. Edges between the vertices show exemplary weights that can represent any cost. For example, the edges might have costs of expected roundtrip time based on numbers of hops, ping, processing time, data rates, or any other factor that may affect the time it takes for the request processor to receive a response after sending a request to locations A-C. As shown, location A has an expected roundtrip time of 0.842 ms, location B has an expected roundtrip time of 1.430 ms, and location C has an expected roundtrip time of 3.094 ms from the request processor 306.

The request processor 306 can be configured to take advantage of the edge weights after parsing a request, for example, a transaction request, with a parser 307. After parsing the transaction request and determining whether to access wallet data and/or ledger data, the request processor executes data locator 308 to determine which location to access. If the request processor 306 determines to access wallet data, it may access the wallet data 314A at location A with the lowest expected roundtrip time. If location A becomes unavailable, the request processor 306 may access location B with the next lowest expected roundtrip time.

The wallet data is preferably stored in fast caches and free of a security mechanism 309 that protects the ledger data but increases the expected roundtrip time. The cache storing the wallet data preferably has a cache data rate that is higher than a storage media data rate of a storage medium on which the ledger data 310C is stored—the cache data rate and the storage medium data rate being defined as the read and/or write throughput of the cache and storage medium (e.g., the data transfer rate, the data transfer rate plus expected processing time for decryption, etc.). The wallet data is preferably mirrored between the locations A-C, so that the system can take advantage of high availability and failover. Thus, even if locations A and B are unavailable, the request processor 306 can still optimize its data access strategy by accessing the wallet data 314C instead of or before accessing the ledger data 310C.

Alternatively, the data locator 308 may inform the determination of whether to access the wallet data and/or the ledger data and thereby affect the update strategy. For example, if all locations with available wallet data (assuming the wallet data 314C at location C is unavailable) are expected to have a higher roundtrip time than the ledger data, then the request processor 306 may access the ledger data 310C directly instead of first accessing the wallet data.

FIG. 4 is a set of timelines according to various execution frequency configuration of an exemplary system. Execution frequency configurations can be used to determine frequencies at which the system executes various operations in preparation for accounting, for example, a periodic final accounting of transactions with an external financial institution. Operations can include summing, detection, reconciliation, and final accounting.

Summing is a process that accounts for entries within the system to determine a balance. For example, when a certain number of transaction entries have accumulated in the ledger data, a backend process can sum the transaction entries' adjustment values (e.g., credits and debits) to update a balance value stored in the ledger data. In some embodiments, the summing process may occur regardless of the fact that the ledger data may include a balance value (e.g., RBAL) that is updated each time an additional transaction is added to the ledger.

Detection is a process that attempts to detect illicit modification of wallet data and/or ledger data. For example, the system can be configured to detect illicit modifications periodically by determining if a balance value stored in the ledger data (e.g., RBAL) matches a balance value stored in the wallet data. If the balance values differ by a non-zero amount, the system may determine that an illicit modification (e.g., to at least one of the balance values) has occurred. Detection can also include a process of notifying an accounts administrator and/or system administrator of the detection results with an option of triggering reconciliation.

Reconciliation is a process that attempts to reconcile irregularities in the data. For example, reconciliation can be triggered automatically or in accordance with an administrative command when illicit modification is detected.

Final accounting is a process that accounts the ledger data. For example, transaction entries accumulated in the ledger data can be sent to or synchronized with an external financial institution. One method of synchronizing the data with an external financial institution involves processing the ledger data to generate a net change in position for all of the accounts in the payment system, and sending the generated net change of position data to the financial institutions associated with each account. The process is not final in the sense that no further accounting can be performed on the data.

The execution frequency of the various operations can impact system performance and security. For example, detection is useful for catching illicit modification of data, which can increase if wallet data is free of the security mechanisms binding the ledger data, however, detection can be a computationally expensive operation. Likewise, determining the frequency of executing the various operations can balance the performance with the security requirements of the system. However, certain efficiencies can be realized with respect to the execution frequencies. Detection can be efficiently executed when performed in conjunction with summing (e.g., the detection executes right after the summing executes), so summing can run at least as frequently as detection. Reconciliation can be efficiently executed when performed in conjunction with detection (e.g., the reconciliation executes right after the detection determines an illicit modification), so detection can run at least as frequently as reconciliation. Final accounting can be dependent on various requirements of a financial institution or the system, and it is preferable to have the data sent to or synchronized with the financial institution to be correct. Therefore, it is preferable (though not required) to have summing, detection, and reconciliation (if needed) execute at least as frequently as final accounting. Various configurations of execution frequencies are provided below.

Timeline 440 reflects a transaction-based execution frequency configuration under which operations can be triggered when a threshold number of transactions have occurred. For example, summing, detection, reconciliation, and final accounting can be configured to run when the system has accumulated n transactions ($tx_1, tx_2, \ldots, tx_n$) that have not yet been accounted in the ledger data. In the illustrated example, upon accumulating n transactions, summing can run, detection can run, reconciliation can run, and final accounting can run. Timeline 440 also reflects a tight grouping of operations in which all operations are configured to run in sequence at one frequency.

Timeline 442 reflects a time-based execution frequency configuration under which operations can be triggered when a number of period(s) ($p_1, p_2, \ldots, p_n$) of time have passed. For example, an operation can be configured to run when one (1) day has passed since the operation was previously run. In the illustrated example, summing runs at every period p, detection and reconciliation (if needed) run at every period $p_m$ (which can be configured to be a function of p), and the four exemplary operations run at every period $p_n$ (which can be configured to be a function of p and/or $p_m$). Alternatively, p can be a function of $p_n$ and/or $p_m$. Timeline 442 also reflects a loose grouping of operations in which various operations are configured to run at various frequencies.

Timeline 444 reflects an event-occurrence execution frequency configuration under which operations can be triggered when a number of event(s) ($e_1, e_2, \ldots, e_n$) have occurred. For example, an operation can be configured to run when the system has sufficient free resources to execute the operation within a predetermined period of time, when a transaction with an adjustment value greater than a predetermined transaction amount threshold has posted, when a balance value falls above or below a predetermined balance threshold, when the wallet data is sent to or synchronized with the ledger data, or when any other event or combination of events based on any parameter related to the account and/or the system occurs. In the illustrated example, summing occurs at every event. Note that the summing at event $e_1$ and the summing at event $e_2$ can have the same or different event triggers. Detection and reconciliation (if needed) are run at event $e_m$ which can be dependent on or independent from the events that trigger the summing. Timeline 444 also reflects a loose grouping of operations in which various operations are configured to run at various frequencies.

The foregoing configurations can be combined and can also be configured by a system administrator, accounts administrator, or any payment system participant. For example, a financial institution may configure a final accounting to run every day at the close of business in the time zone in which the financial institution is located and configure detection to run on all accounts in the payment system with which it is associated on an hourly basis. The system can also choose a configuration adaptively with various criteria such as available system resources and/or security requirements. Further, the sequence, grouping, and triggers of operations can be combined in any other manner.

Figure 5:
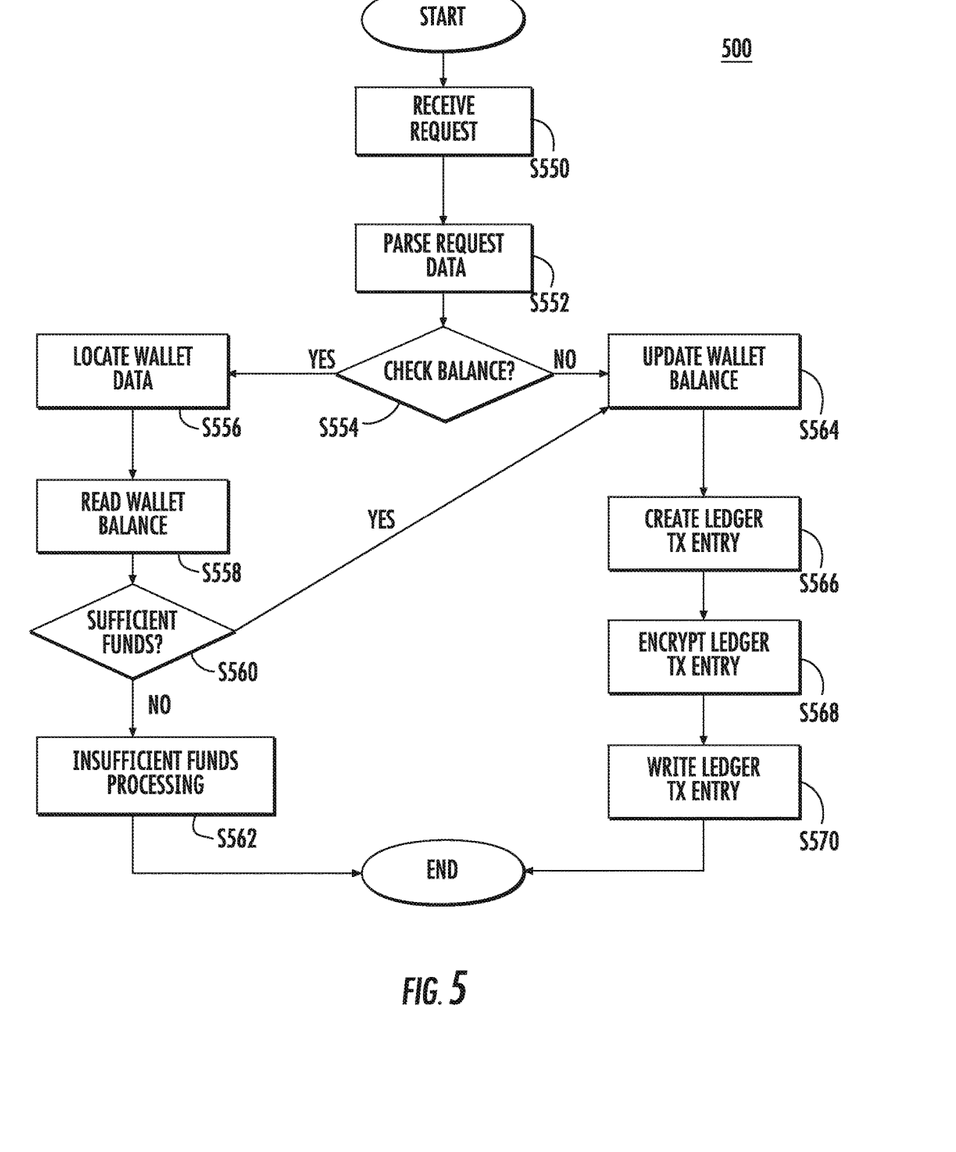
FIG. 5 is a flow diagram of an exemplary transaction processing method.

FIG. 5 is a flow diagram of an exemplary transaction processing method 500. The method 500 starts upon receiving a transaction request at S550, for example, at a request processor. After receiving the request, the request processor can parse the transaction request data at S552.

Based on the parsed data, the request processor can determine whether to access the wallet data at S554; for example, the wallet data may include a balance associated with an account participating in the transaction, and the transaction may require that the balance is checked. If the wallet data needs to be accessed (e.g., the system must check the balance), the data locator optionally locates the wallet data at S556. If the wallet data does not need to be located, this step can be omitted. The request processor then accesses the wallet data for the account specified in the transaction request (e.g., reads the wallet balance) at S558.

The request processor then determines whether the account has sufficient funds at S560 based on the adjustment amount requested in the transaction request and the read balance from the wallet data. If the account does not have sufficient funds, the request processor executes insufficient funds processing at S562, which can include, for example, returning a message to the requestor notifying the requestor of insufficient funds in the account and canceling the transaction. The method 500 can then end. If the account does have sufficient funds at S560, the request processor can update the wallet balance at S564, create a ledger transaction entry for insertion into and/or update to the ledger data at S566, encrypt the ledger transaction entry at S568, and writing (i.e., inserting and/or updating) the ledger transaction entry in the ledger data at S570. Although not shown, the requestors can also be notified that the transaction has been effected, thus allowing the requestor to conduct any remaining obligations to finalize the transaction. The method 500 can then end.

The wallet data may not need to be immediately accessed at S554. For example, the wallet data may include only balance values of the wallet, the requestor may be depositing money only in the transaction, and the third update strategy is chosen. In this example, the wallet balance value corresponding to the account does not need to be accessed, and the method 500 can proceed through steps S564-S570 before ending as described above.

Figure 6:
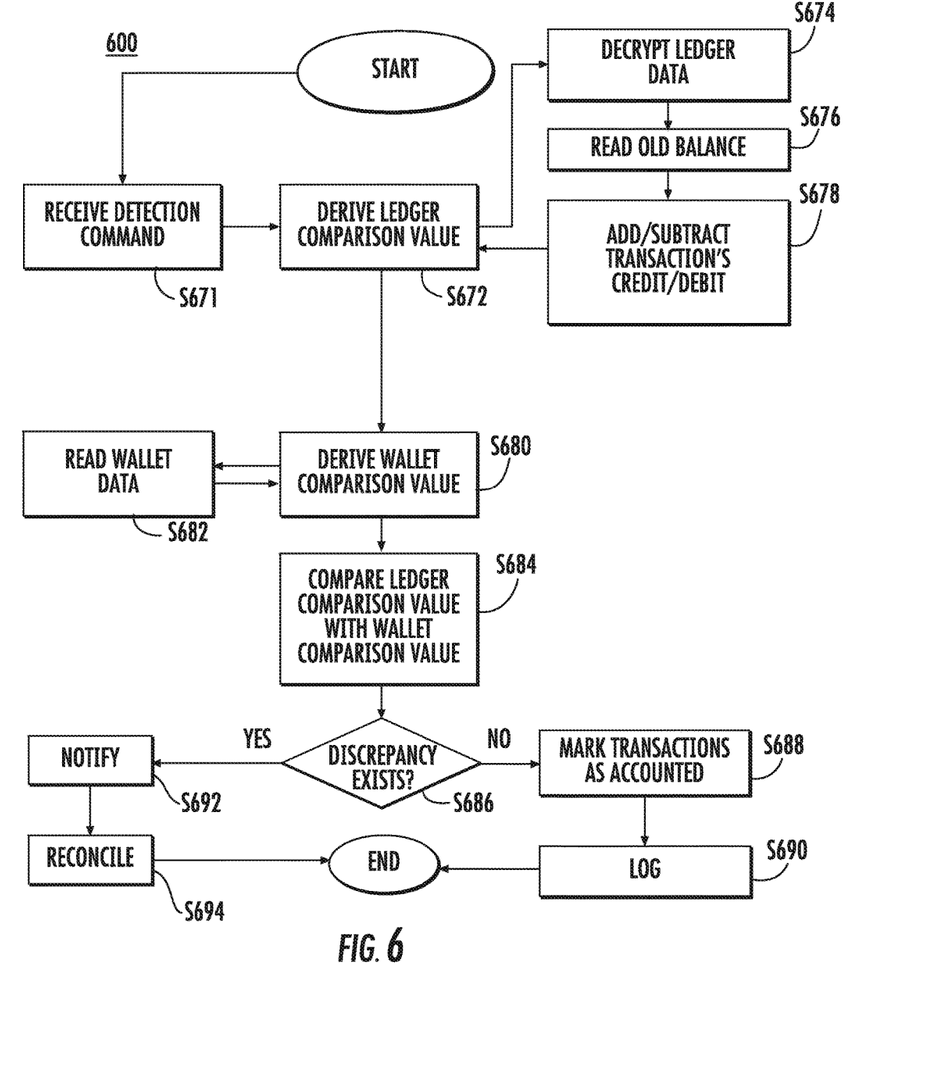
FIG. 6 is a flow diagram of an exemplary detection method.

FIG. 6 is a flow diagram of an exemplary detection method 600. The method 600 starts by receiving a detection command at S671, for example, in accordance with a detection frequency strategy. The method 600 then derives a ledger comparison value at S672 by decrypting the relevant ledger data (e.g., transactions not yet summed) at S674, reading an old balance at S676, and adding to or subtracting from the old balance each transaction's credit or debit adjustment (for example, for each transaction not yet summed) at S678. The method 600 then derives the wallet comparison value at S680 by reading the wallet data at S682.

The steps of deriving the ledger comparison value at S672 and deriving the wallet comparison value at S680 can run in any order and/or in parallel.

The ledger comparison value and the wallet comparison value are compared at S684, and the method determines whether a discrepancy exists (e.g., the wallet comparison value differs from the ledger comparison value) at S686. If no discrepancy exists, then the method optionally marks transactions as account at S688. The step is optional because a pure detection method (e.g., without summing/accounting) does not need to mark transactions, but a detection method that runs in conjunction with a summing/accounting method can mark the transactions as summed or accounted. Information regarding results of the detection method are then optionally logged at S690 and the method 600 can end. If a discrepancy exists, then an administrator (e.g., system administrator and/or account administrator) is optionally notified at S692, the discrepancy is reconciled at S694, and the method can end.

While the one or more embodiments are described in detail with respect to specific embodiments of the invention, it should be appreciated that those skilled in the art, upon attaining an understanding of the foregoing description, may readily conceive of alterations to, variations of, and equivalents to the one or more described embodiments. These and other modifications and variations to the present invention may be practiced by those of ordinary skill in the art, without departing from the spirit and scope of the present invention. Furthermore, those of ordinary skill in the art will appreciate that the following description is by way of example only, and is not intended to limit the invention. Thus, it is intended that the present subject matter covers such modifications and variations.

Accordingly, the invention can be implemented in numerous ways, including as an apparatus, a system, a device, a computer-implemented method, and/or a computer-readable medium. A non-transitory computer-readable storage medium stores computer-readable instructions or other program code, which when executed by one or more processors, cause a computer to perform a method in accordance with the one or more embodiments. Examples of a medium includes, but is not limited to, circuit-based media (e.g., read-only memory, flash memory, solid-state drive), magnetic media (e.g., hard drive, tape, floppy disk, magstripe card), optical media (e.g., compact disc, digital versatile disc, Blu-ray Disc), and any combination of such media. A system is a computer-based system with one or more processors executing instructions on one or more network-attached nodes. A processor can be any hardware-based processing device including, but not limited to, a central processing unit with one or more cores, a reduced-instruction set processor, a field-programmable gate array, a general purpose graphics processing unit, and any combination of such processing devices. A network can run over any physical communications medium, including, but not limited to, Ethernet, WiFi, infrared, universal serial bus, optical fiber, Bluetooth, telephone network, bus interfaces, and any combination of such physical communications media. Data can be stored in any known format, such as in a database (e.g., managed by a database management system, or in files on a file system). As used herein, the term "database" encompasses any computer-readable data storage mechanism, and the term "table" encompasses any logical data structure configured to store data. It should be appreciated that the exact implementation is not limited to any single particular hardware or software configuration.

Other variations and modifications can include known authentication and authorization schemes. Any level of data access can be authenticated and authorized in accordance with known methods and systems and security requirements.

What is claimed is:

1. A computer-implemented method of securely monitoring a balance of a payment account, the method comprising:
   encrypting, by a request processor, ledger data, the ledger data including ledger transaction information for the payment account, whereby the encrypting produces encrypted ledger data;
   storing, in a first database by the request processor, a ledger table comprising the encrypted ledger data;
   storing, in a second database by the request processor, a wallet table comprising non-encrypted wallet data, the wallet data including a wallet balance value for the payment account;

detecting, by the request processor during a detection operation, whether at least one of the ledger table or the wallet table has been improperly modified by an illicit event occurrence, wherein the detecting includes:
  decrypting the ledger data, thereby obtaining decrypted ledger data;
  deriving a ledger comparison value from the decrypted ledger data; and
  comparing the ledger comparison value to a wallet comparison value; and
performing, by the request processor during a transaction operation using the payment account, an access operation on the wallet table;
wherein the access operation comprises reading the wallet balance value from the wallet data in the wallet table; and
wherein the transaction operation is initiated and approved without accessing the ledger table.

2. The computer-implemented method of claim 1, wherein the detecting comprises:
  maintaining the decrypted ledger data in a protected memory space for a duration of the detection operation; and
  erasing the decrypted ledger data from the protected memory space upon completion of the detection operation.

3. The computer-implemented method of claim 1, further comprising mirroring the wallet data across a plurality of wallet data storage locations, wherein a number of the wallet data storage locations is greater than a number of ledger data storage locations.

4. The computer-implemented method of claim 1, further comprising initiating the transaction operation using the payment account and performing, via the request processor, the transaction operation, wherein performing the transaction operation comprises:
  performing the access operation on the wallet table;
  authorizing a transaction associated with the transaction operation;
  updating the wallet table based on the transaction; and
  updating the ledger table based on the transaction.

5. The computer-implemented method of claim 1, wherein the ledger transaction information for the payment account comprises transaction information corresponding to completed transactions associated with the payment account.

6. The computer-implemented method of claim 5, wherein the wallet comparison value comprises the wallet balance value for the payment account.

7. The computer-implemented method of claim 6, wherein deriving the ledger comparison value comprises:
  obtaining a prior balance value from the decrypted ledger data corresponding to a first time, wherein at least one subsequently completed transaction occurring later than the first time is recorded in the decrypted ledger data; and
  computing the ledger comparison value as a sum of credits and debits corresponding to each of the at least one subsequently completed transaction and the prior balance value.

8. The computer-implemented method of claim 1, further comprising setting a wallet data flag on the wallet data, wherein the wallet data flag, when set, restricts a set of access operations that can be performed on the wallet data.

9. The computer-implemented method of claim 1, further comprising accounting the ledger data with a financial institution associated with the payment account at time intervals of a first period.

10. The computer-implemented method of claim 9, wherein the detecting is performed at time intervals of a second period, and wherein the second period is derived as a function of the first period.

11. The computer-implemented method of claim 10, wherein at least one of the first period or the second period is configurable by an account administrator.

12. The computer-implemented method of claim 1, further comprising:
  updating the wallet table at a time of completion of the transaction operation; and
  updating the ledger table at a time subsequent to the time of completion of the transaction operation.

13. The computer-implemented method of claim 1, further comprising updating the wallet table and the ledger table at a time of completion of the transaction operation.

14. The computer-implemented method of claim 1, further comprising:
  determining whether the wallet table is available at a time of completion of the transaction operation; and
  if the wallet table is not available, updating the ledger table at the time of completion of the transaction operation and synchronizing the wallet table to the ledger table at a time subsequent to the time of completion of the transaction operation.

15. The computer-implemented method of claim 1, further comprising reconciling, by the request processor, the wallet data with the ledger data if a nonzero difference between the ledger comparison value and the wallet comparison value is identified via the detecting.

16. The computer-implemented method of claim 1, wherein the access operation is a balance check operation.

17. A computer-based system for securely monitoring a balance of a payment account, the system comprising:
  an encryption module configured to encrypt ledger data, the ledger data including ledger transaction information for the payment account, thereby producing encrypted ledger data;
  a data access module configured to store, in a first database, a ledger table comprising the encrypted ledger data and to store, in a second database, a wallet table with non-encrypted wallet data, the wallet data including a wallet balance value for the payment account; and
  a detection module configured to detect whether at least one of the ledger table or the wallet table has been improperly modified by an illicit event occurrence, by:
    deriving a wallet comparison value from the wallet data;
    decrypting the ledger data, thereby obtaining decrypted ledger data;
    deriving a ledger comparison value from the decrypted ledger data; and
    comparing the ledger comparison value to the wallet comparison value;
  wherein the data access module is further configured to perform an access operation on the wallet table during a transaction operation using the payment account, the access operation comprising reading the wallet balance value from the wallet data in the wallet table; and
  wherein the transaction operation is initiated and approved without accessing the ledger table.

18. The computer-based system of claim 17, wherein the data access module is further configured to store the first database physically and logically separate from the second database.

19. The computer-based system of claim 17, wherein the data access module is further configured to store the first database on a storage medium having a first data rate and to store the second database on a cache having a second data rate that is faster than the first data rate.

20. The computer-based system of claim 17, wherein the detection module is further configured to reconcile the wallet data with the ledger data if the ledger comparison value and the wallet comparison value differ by a nonzero amount.

* * * * *